Feb. 6, 1968           G. C. ARMSTRONG           3,367,463
CENTRIFUGAL CLUTCH WITH SNAP ACTION LEAF SPRING
Filed July 26, 1965                                  2 Sheets-Sheet 1
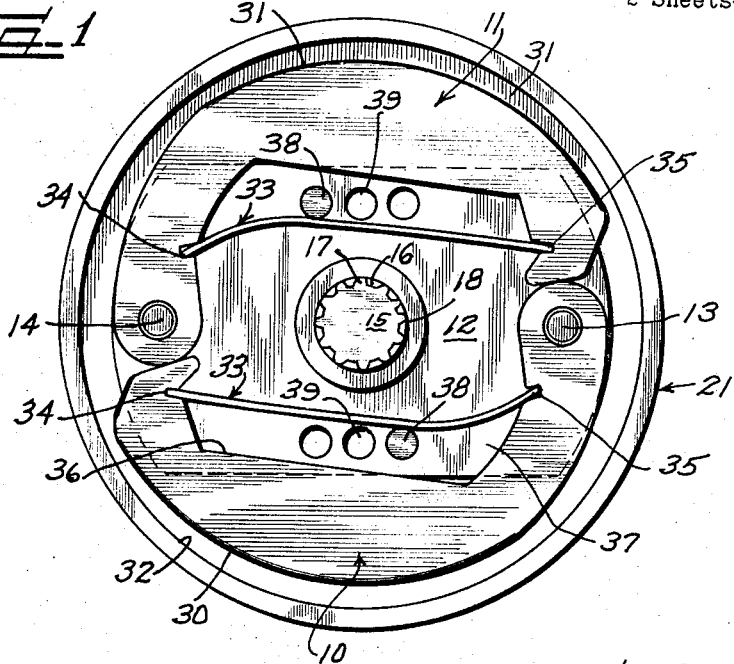
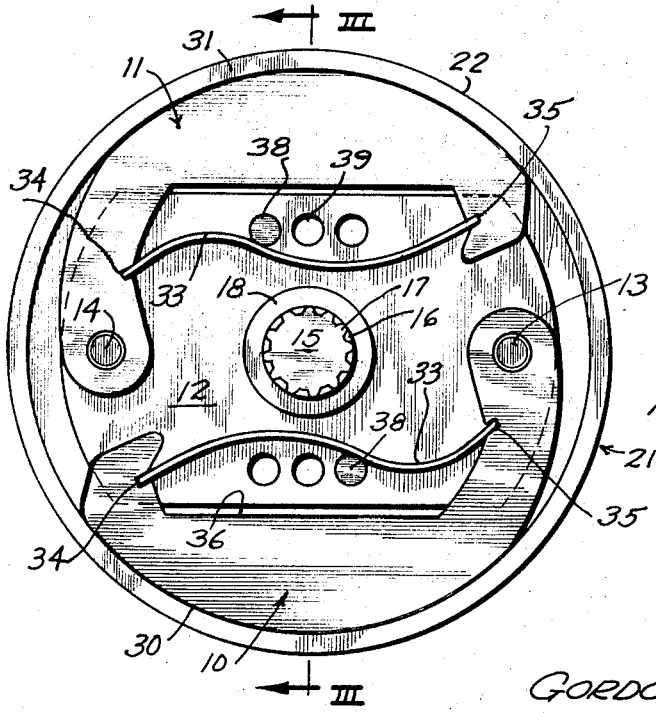
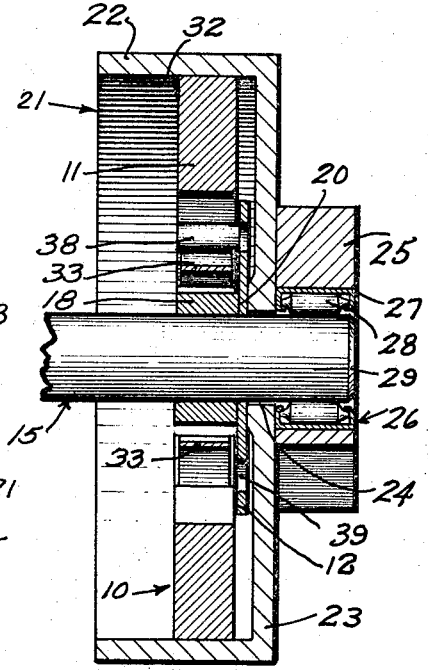
INVENTOR.
GORDON C. ARMSTRONG
BY                               ATTORNEYS

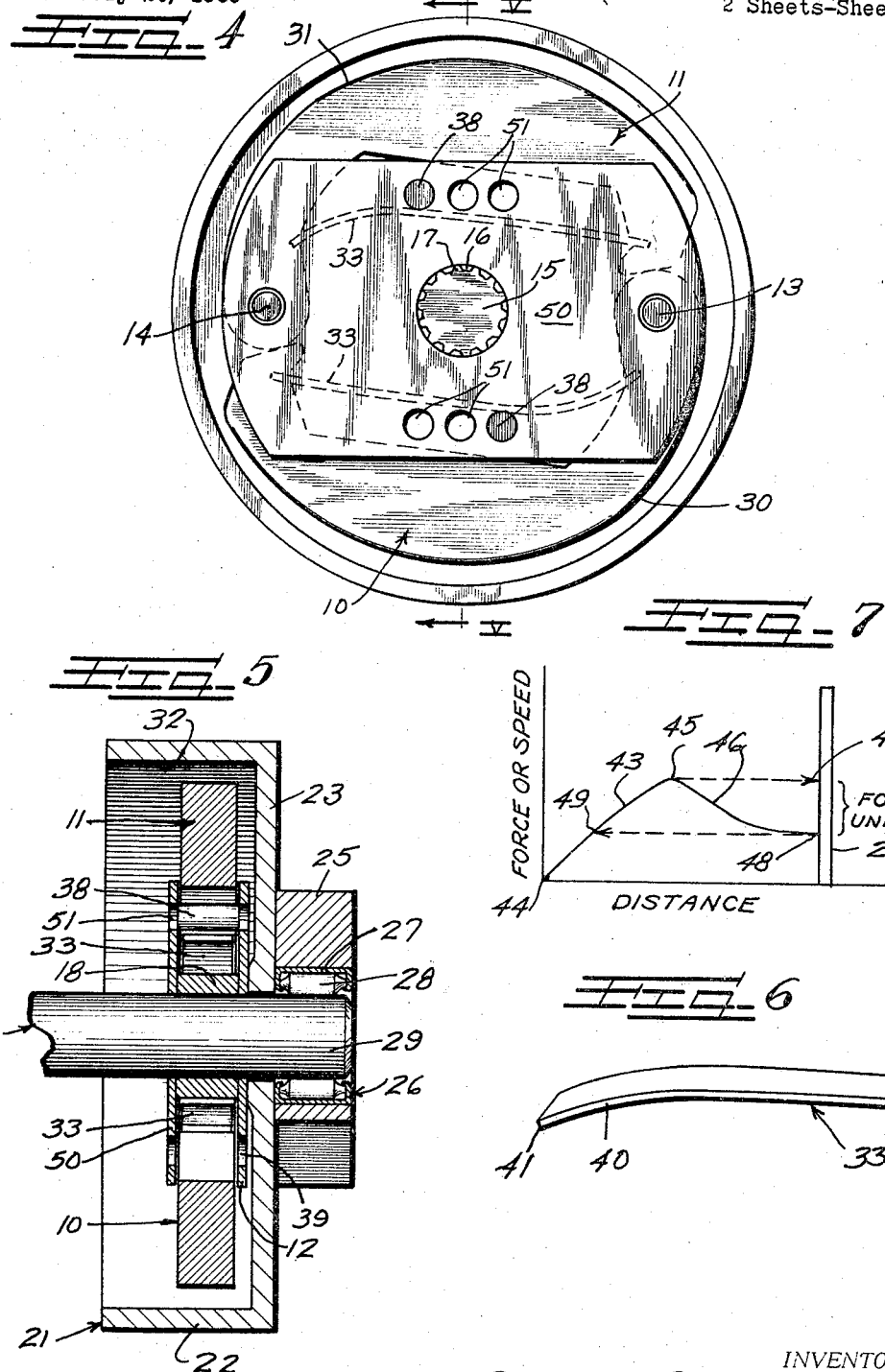

United States Patent Office 3,367,463
Patented Feb. 6, 1968

3,367,463
CENTRIFUGAL CLUTCH WITH SNAP ACTION
LEAF SPRING
Gordon C. Armstrong, 306 Nicholson St.,
Joliet, Ill. 60435
Filed July 26, 1965, Ser. No. 474,840
13 Claims. (Cl. 192—105)

ABSTRACT OF THE DISCLOSURE

A centrifugal clutch having an outer housing with a circular axial flange, a drive plate rotatably mounted within the housing and an arcuately shaped clutch shoe pivotally mounted at the drive plate, a leaf spring spanning an arc of the arcuately shaped clutch shoe and a restraining pin mounted at the drive plate intermediate the leaf spring and the brake shoe, abutment means contacting the ends of the springs so as to restrain the ends of the springs from spreading during clutch operation, the ends of the springs associated with each shoe being circumferentially on the same side of the shoe pivot. The leaf spring coacts with the restraining pin for maintaining the clutch shoe in a disengaged position at a relatively low speed of the drive plate and for engaging the circular axial flange at a relatively high speed thereof.

---

This invention relates to a centrifugal clutch and in particular to a centrifugal clutch utilizing a leaf spring and a cooperable restraining pin to provide a reverse force characteristic to the centrifugal operation of associated brake shoes.

Centrifugal clutch mechanisms have currently employed either coil or leaf springs for biasing friction clutch shoes into a disengaged position with a cooperable clutch drum. The manner in which such springs have been employed, however, has not been entirely satisfactory.

Characteristically, clutch shoes of centrifugal clutch mechanisms are mounted to a rotating shaft and disposed for being urged against a clutch drum by the resulting angular acceleration of the system. Angular acceleration simulates gravitational acceleration and imparts added weight to the clutch shoes for providing a rigid frictional contact with the associated rotating drum.

If has been common in such systems to utilize the coil or leaf springs for opposing the centrifugal force of the clutch shoes and for allowing engagement with the drum only after a given rotational speed. Heretofore, however, such springs have resulted in an inward bias which increases with an outward progression of the shoes corresponding to an expansion of the springs.

This increasing bias means that just prior to engagement of the clutch shoe with the outer drum, a balance exists between the outwardly directed centrifugal force and the inwardly directed spring force. Therefore, the clutch shoes may remain in a semi-engaged state for a substantial period. During this time, slip, wear, and chatter of the cooperable parts may be expected.

In addition, after engagement has been accomplished, a retarding of the drive speed, due to increased engine load, for example, will result in a reduction in centrifugal force which permits disengagement of the clutch. Disengagement at this point occurs precisely when full power is required.

Therefore, it is an object of this invention to provide a centrifugal clutch mechanism which eliminates excessive chatter, slip, and wear during engagement and disengagement of the clutch shoes with the outer drum.

It is also an object of this invention to provide a centrifugal clutch mechanism having a rapid snap-in and snap-out engagement feature.

It is another object of this invention to provide a centrifugal clutch mechanism utilizing a biasing means having a reverse force characteristic.

It is a further object of this invention to provide a centrifugal clutch having a preformed leaf spring collapsible about a restraining pin and slidably receivable within slots or notches formed at associated clutch shoes.

It is an additional object of this invention to provide a centrifugal clutch having the above-mentioned features and having a restraining pin which is selectably positioned for varying the engagement and disengagement speeds thereof.

These and other objects, features and advantages of the present invention will be understood in greater detail from the following description and the associated drawings wherein reference numerals are utilized in designating a preferred embodiment and wherein:

FIGURE 1 is a top view of a centrifugal clutch according to this invention showing the clutch shoes and associated leaf springs in a disengaged position;

FIGURE 2 is a view similar to that shown in FIGURE 1 for illustrating the deflection of the associated leaf springs during engagement of the clutch shoes;

FIGURE 3 is a sectional view of the clutch assembly of this invention as taken along the lines III—III of FIGURE 2;

FIGURE 4 is a top view of the centrifugal clutch of this invention showing an additional cover plate and illustrating the pivotal connections of the associated clutch shoes;

FIGURE 5 is a sectional view of the centrifugal clutch as taken along the lines V—V of FIG. 4 for illustrating a disengaged relationship between the clutch shoes and the outer drum;

FIGURE 6 is an elevational view of the leaf spring utilized in the centrifugal clutch of this invention and illustrating the preformed structure thereof, and FIGURE 7 is a diagram of a hypothetical spring characteristic which is applicable to the leaf spring of this invention and which illustrates the nature of the snap-in, snap-out quality.

A preferred embodiment of this invention is shown in FIGURES 1 and 2 as comprising a pair of pivotally mounted clutch shoes orientated interiorly of a circular flange or clutch drum and disposed to be rotated by a central drive shaft. Rotation of the clutch assembly develops a centrifugal force for urging the clutch shoes outwardly of their pivotal mountings to engage the cooperable surface of the associated clutch drum.

While the centrifugal force developed by rotation of the clutch assembly urges the clutch shoes in an outwardly direction, actual movement of the shoes is limited through the provision for a leaf spring having a highly specialized character and employed in a novel manner for accomplishing an improved clutch control.

Referring to FIGURES 1, 2 and 3 in greater detail, the clutch shoes 10 and 11 are shown pivotally mounted to a drive plate 12 at points 13 and 14 respectively. The drive plate 12 is splined to a central drive shaft 15 at the cooperable surfaces 16 and 17. The splined surface 17 is formed externally of the shaft 15 and the cooperable surface 16 is formed internally of a sleeve or collar 18 securely mounted as by welding or the like to a point 20 at the drive plate 12.

The drive shaft 15 is the power member of the clutch assembly and is rotatably mounted relative to an outer housing or clutch drum 21. The clutch drum 21 has a cylindrical flange 22 for being engaged by the cooperable shoes 10 and 11 and a base wall 23 for supporting the clutch assembly.

The shaft 15 extends through an opening 24 formed centrally of the base wall 23 and is received within an end bearing housing 25 rigidly mounted to the wall 23 as by welding or the like. The housing 25 is provided with a roller bearing assembly 26 having an outer racer 27 and rollers 28 cooperable with the outer surface 29 of the shaft 15. In this way, the shaft 15 together with the clutch assembly may be rotated independently of the clutch drum 21 for gaining an initial speed prior to engagement of the clutch shoes 10 and 11.

The clutch shoes 10 and 11 have arcuately shaped surfaces 30 and 31 respectively for being cooperable with the inner surface of the cylindrical wall 22. Principally, the clutch shoes are pivoted at one end thereof for having the arcuately shaped surfaces 30 and 31 driven into engagement with the surface 32 to transmit torque from the drive shaft 15 to the clutch drum 21.

The centrifugal force which accomplishes the engagement function between the clutch shoes and the inner surface 32 of the drum 21 is opposed by individual leaf springs slidably received within slots 34 and 35 formed at opposite ends of the clutch shoes. The leaf spring 33 together with a recessed wall 36 of the clutch shoes 10 and 11 provide an adjustable speed control region 37 wherein the actuation speed of the clutch assembly is determined.

The clutch shoes 10 and 11 are biased against outward centrifugal motion through the provision for a restraining pin 38 disposed within the speed control region 37. The restraining pin 38 is removably positioned within one of a series of adjustment openings 39 formed within the drive plate 12. It is apparent from FIGURE 1, therefore, that for the clutch shoes 10 and 11 to progress outwardly to an engagement position, the leaf spring 33 must collapse about the restraining pin 38 as illustrated in FIGURE 2.

The centrifugal force and, hence, the speed of the drive plate 12 required to collapse or deflect the leaf spring 33 will be determined by the relative distance between the slot 34 and the restraining pin 38. This is due to the fact that the spring 33, as disposed within the clutch assembly, operates as a lever. Pressure is applied to the spring at the slot 34, the fulcrum is established at the restraining pin 38, and the load to be moved is the inherent rigidity of the spring itself. By changing the positioning of the pin 38 relative to the pressure applied to the spring at the slot 34, the pressure required to move the load may be varied. In particular, positioning the restraining pin 38 within one of the openings 39 closer to the pressure point of the slot 34 increases the centrifugal force and hence the rotational speed required to collapse the leaf spring 33. In this way, improved clutch control is achieved by providing a readily available means for adjusting the clutch engagement speed.

In addition to providing an adjustable engagement speed control, the clutch assembly of this invention utilizes a novel leaf spring construction which in conjunction with the readily movable restraining pin 38 provides a snap-in-snap-out engagement of the clutch shoes. This snap-in-snap-out action is accomplished by preforming the leaf spring 33 as at 40, by allowing the ends 41 and 42 of the spring 33 to be freely movable within their respective slots 34 and 35, and by orientating the restraining pin 38 to generate a reverse bend in the spring 33 during outward progression of the clutch shoes.

This reverse bend, as generated in FIGURE 2, has the effect of suddenly diminishing the inward bias on the restraining pin 38 and allowing the outwardly directed centrifugal force to snap the clutch shoes into engagement. Essentially, the preformed leaf spring, as shown in FIGURE 1, is provided with excess length between the cooperable slots 34 and 35. In FIGURE 1 this excess length is disposed inwardly toward the clutch shoes for pressing against the pin 38. However, upon outward progression of the shoes 10 and 11, the leaf spring 33 is reformed as shown in FIGURE 2 for having a portion thereof curved outwardly of the associated clutch shoe. Once in this reformed or outwardly curved state, the leaf spring 33 establishes internal stresses for maintaining this new configuration and, therefore, exerts a greatly reduced force on the restraining pin 38.

The net force exerted on the restraining pin 38 and, hence, the net inward bias to the clutch shoes 10 and 11 may be visualized by reference to FIGURE 7 which shows a force diagram applicable to the clutch shoes of this invention.

In FIGURE 7 the vertical axis is indicative of the biasing or inward force exerted on the pivotally mounted clutch shoes, while the horizontal axis represents the distance travelled by the respective shoes from idle to a full engagement position. As the centrifugal force exerted on the shoes 10 and 11 increases due to increasing rotational speed of the shaft 15, the inward bias on the clutch shoes increases according to the curve 43 from a minimum at the point 44 to a peak at 45. At the point 45, the leaf spring 33 has sufficiently reformed such that the force exerted on the restraining pin 38 begins to diminish as at 46. However, the opposing centrifugal force has been steadily increasing due to an increasing speed of the systems and, accordingly, a sudden imbalance occurs between the inwardly and outwardly directed forces causing the clutch shoes 10 and 11 to snap from the intermediate position 45 to a position of full engagement 47 with the cylindrical wall 22.

The force differential that causes an outward snapping of the clutch shoes 10 and 11 similarly prevents disengagement of the clutch mechanism upon a slight reduction in rotational speed. With the clutch mechanism in full engagement, the centrifugal force on the shoes 10 and 11 may be comparable to the point 47 in FIGURE 7, while the inwardly directed spring tension due to the reforming unloading factor may be comparable to the point 48. It is apparent, therefore, that a slight reduction in speed and, hence, in centrifugal force will not cause a retraction of the clutch shoes. This is because retraction of the clutch shoes will not occur until the centrifugal force is reduced below the magnitude of the spring tension 48. Therefore, once engagement has been accomplished considerable vacillations in the rotational speed can be permitted without provoking disengagement of the clutch assembly.

Once, however, the speed and, hence, the centrifugal force is reduced below the level shown at 48, a force imbalance will occur for snapping the clutch shoes from the full engagement position at 48 to a disengaged position 49 after the position 49 has been reached, a force balance between the spring resistance and the centrifugal force will be restored, and a further reduction in rotational speed will cause the clutch to retract along the spring characteristic 43 to the idle state 44.

Therefore, engagement of the clutch mechanism of this invention involves initial motion of the clutch shoes through a state of substantial equilibrium and a final motion through a non-equilibrium state. Similarly, disengagement of this clutch mechanism involves initial motion through a non-equilibrium state and final retraction motion through a substantial state of equilibrium. The resulting snap-in-snap-out motion reduces unwarranted slip and wear of the clutch shoes and in addition provides increased power to the clutch drum during periods of temporarily decreased engine speed.

In FIGURES 4 and 5, the clutch assembly of this invention is provided with a cover plate 50 which is similar to the drive plate 12 and which provides additional reinforcement for the restraining pins 38 at a series of openings 51. In this way, the pins 38 are anchored at opposing faces of the clutch shoes 10 and 11 with the result that additional consistency and predictability of speed control can be achieved. In addition, the plate 50 may be used as a further support for the respective pivots 13 and 14.

It will be understood that various modifications may be suggested by the embodiment disclosed, but I desire to claim within the scope of the patent warranted hereon all such modifications as come within the scope of my invention.

I claim as my invention:

1. A centrifugal clutch comprising:
an outer housing having a circular axial flange,
a drive plate rotatably mounted within said housing and an arcuately shaped clutch shoe pivotally mounted at said drive plate, a leaf spring generally spanning an arc of said arcuately shaped clutch shoe, a restraining pin mounted at said drive plate intermediate said leaf spring and said brake shoe, and
abutment means contacting the ends of the spring so as to prevent the ends of the spring from spreading during clutch operation and with the ends of the spring cooperable with the associated shoe being disposed on the same side of the shoe pivot,
said leaf spring coacting with said restraining pin for maintaining said clutch shoe in a disengaged position at a relatively low speed of said drive plate and for engaging said circular axial flange at a relatively high speed thereof.

2. A centrifugal clutch comprising:
an outer housing having a circular axial flange,
a drive plate rotatably mounted within said housing and an arcuately shaped clutch shoe pivotally mounted at said drive plate, a leaf spring spanning an arc of said arcuately shaped clutch shoe and a series of bores formed within said drive plate adjacent said leaf spring,
a restraining pin removably positioned within one of said bores and extending intermediate said leaf spring and said clutch shoe,
said leaf spring coacting with said restraining pin for maintaining said clutch shoe in a disengaged position at a relatively low speed of said drive plate and for engaging said circular axial flange at a relatively high speed thereof,
said restraining pin may be removable and engageable in any one of said bores for coacting with said leaf spring in a changeable set of relationships.

3. A centrifugal clutch comprising:
an outer housing having a circular axial flange,
a drive plate rotatably mounted within said housing and an arcuately shaped clutch shoe pivotally mounted at said drive plate,
a leaf spring spanning an arc of said arcuately shaped clutch shoe and a series of bores formed within said drive plate adjacent said leaf spring,
said leaf spring having a substantially undeflected configuration at idle speeds and a deflected configuration at relatively high speeds,
said series of bores arranged to be substantially aligned with said leaf spring while deployed in said undeflected configuration,
a restraining pin removably engageable with any one of said bores for changing the effect of said spring and extending intermediate said leaf spring and said clutch shoe,
said leaf spring coacting with said restraining pin for maintaining said clutch shoe in a disengaged position at a relatively low speed of said drive plate and for engaging said circular axial flange at a relatively high speed thereof,
said clutch shoe having a relatively lightweight body, said relatively lightweight body coacting with said restraining pin for urging said leaf spring into said deflected status at relatively high speeds of said drive plate, said deflected status corresponding to engagement of said clutch shoe with said circular axial flange.

4. A centrifugal clutch comprising:
an outer housing having a cylindrical flange,
a drive plate rotatably mounted within said housing axially of said cylindrical flange,
arcuately shaped clutch shoes pivotally mounted at one end thereof to said drive plate for being urged against said cylindrical flange during rotation of said drive plate,
a restraining pin disposed in the vicinity of each of said clutch shoes,
a leaf spring secured at opposite ends and with at least one end secured to each of said clutch shoes and generally spanning an arc thereof,
said leaf spring engaging said restraining pin during rotation of said drive plate for resisting outward motion of said clutch shoe, said leaf spring being resiliently collapsible about said restraining pin by a centrifugal force associated with rotation of said shoe at a pre-selected speed, there being sufficient clearance between the shoes and the drum to allow the springs to move from a generally arcuate shape to a generally S-shape to give a snap action.

5. A centrifugal clutch comprising:
an outer housing having a cylindrical flange,
a drive plate rotatably mounted within said housing axially of said cylindrical flange,
arcuately shaped clutch shoes pivotally mounted at one end thereof to said drive plate for being urged against said cylindrical flange during rotation of said drive plate,
a restraining pin disposed in the vicinity of each of said clutch shoes,
first and second notches disposed within each of said clutch shoes and an arc separating said notches,
a leaf spring having opposite ends slidably received within said first and second notches, and spanning said arc thereby,
said first and second notches comprising abutment means with opposite ends of the associated spring engaged therein to prevent the ends of the spring from spreading during clutch operation and with the ends of the spring operative with the associated shoe being disposed circumferentially on the same side of the shoe pivot,
said leaf spring engaging said restraining pin during rotation of said drive plate for resisting outward motion of said clutch shoe, said leaf spring being resiliently collapsible about said restraining pin by a centrifugal force associated with rotation of said shoe at a pre-selected speed.

6. A centrifugal clutch comprising:
an outer housing having a cylindrical flange,
a drive plate rotatably mounted within said housing axially of said cylindrical flange,
arcuately shaped clutch shoes pivotally mounted at one end thereof to said drive plate for being urged against said cylindrical flange during rotation of said drive plate,
a restraining pin disposed in the vicinity of each of said clutch shoes,
a leaf spring cooperable with each of said clutch shoes and abutment means cooperable between the shoes and the springs to restrain movement of the spring as the shoes are engaged with the drum,
said leaf spring having a preset curve, said leaf spring engaging said restraining pin during rotation of said drive plate for resisting outward motion of said clutch shoe, said restraining pin cooperating with said preset curve to deflect said leaf spring into a predictable configuration, said leaf spring being resiliently collapsible about said restraining pin by a centrifugal force associated with rotation of said shoe at a pre-selected speed, there being sufficient clearance between the shoes and the drum to allow the springs to move from a generally arcuate shape to a generally S-shape to give a snap action.

7. A centrifugal clutch comprising:
an outer housing having a cylindrical flange,
a drive plate rotatably mounted within said housing axially of said cylindrical flange,
arcuately shaped clutch shoes pivotally mounted at one end thereof to said drive plate for being urged against said cylindrical flange during rotation of said drive plate,
a restraining pin disposed in the vicinity of each of said clutch shoes,
first and second slots disposed within each of said clutch shoes and an arc thereof separating said notches,
a leaf spring having opposite ends slidably received within said first and second notches and spanning said arc thereby,
said notches including abutment means contacting the ends of the spring so as to hold the ends of the spring against spreading during clutch operation,
said leaf spring having a preset curved portion in the vicinity of said pivotally mounted end of said clutch shoe, said leaf spring engaging said restraining pin during rotation of said drive plate for resisting outward motion of said clutch shoe,
said leaf spring being collapsible into an S-shaped configuration by virtue of said preset curve and said restraining pin due to a centrifugal force associated with rotation of said clutch shoe at a preselected speed,
said S-shaped configuration being inwardly extending in the vicinity of said pivotally mounted end of said clutch shoe and being outwardly extending in the vicinity of the opposite end thereof,
said opposite ends of said leaf spring being freely rotatable within said notches upon deflection about said restraining pin.

8. A centrifugal clutch comprising:
an outer housing having a cylindrical flange,
a drive plate rotatably mounted within said housing axially of said cylindrical flange,
arcuately shaped clutch shoes pivotally mounted at one end thereof to said drive plate for being urged against said cylindrical flange during rotation of said drive plate,
a restraining pin disposed in the vicinity of each of said clutch shoes,
a leaf spring secured to each of said clutch shoes and spanning an arc thereof,
abutment means contacting the ends of the spring so as to hold the ends of the spring against spreading during clutch operation,
said leaf spring engaging said restraining pin during rotation of said drive plate for resisting outward motion of said clutch shoe,
said leaf spring being resiliently collapsible about said restraining pin by a centrifugal force associated with rotation of said shoe at a preselected speed,
said leaf spring having a deflection characteristic with a decreasing force segment for progressive positions of said clutch shoe outward of a determinable point thereon,
whereby said clutch shoe will remain in engagement with said cylindrical flange for speeds of said drive plate below the speed thereof required for initial engagement.

9. A centrifugal clutch comprising:
an outer housing having a cylindrical flange,
a drive plate rotatably mounted within said housing axially of said cylindrical flange,
arcuately shaped clutch shoes pivotally mounted at one end thereof to said drive plate for being urged against said cylindrical flange during rotation of said drive plate,
a series of bores formed in the vicinity of each of said clutch shoes,
a leaf spring secured at opposite ends to each of said clutch shoes and spanning an arc thereof,
a restraining pin removably disposed in any of said bores and extending between said leaf spring and said associated clutch shoe,
said leaf spring having a preset curve formed at one end thereof, said leaf spring engaging said restraining pin during rotation of said drive plate for resisting outward motion of said clutch shoe,
said leaf spring being collapsible into an S-shaped configuration by virtue of said preset curve and said restraining pin due to a centrifugal force associated with rotation of said clutch shoe at a preselected speed,
said leaf spring having an S-shaped configuration which is selectably variable by changing the positioning of said restraining pin within said series of bores.

10. A centrifugal clutch comprising:
an outer housing having a cylindrical flange,
a drive plate rotatably mounted within said housing axially of said cylindrical flange,
arcuately shaped clutch shoes pivotally mounted at one end thereof to said drive plate for being urged against said cylindrical flange during rotation of said drive plate,
a series of bores formed in the vicinity of each of said clutch shoes,
first and second notches disposed within each of said clutch shoes and an arc thereof separating said notches,
a leaf spring having opposite ends slidably received within said first and second notches to prevent the ends of the spring from spreading during clutch operation,
a restraining pin removably disposed in one of said bores and extending between said leaf spring and said associated clutch shoe,
said leaf spring having a preset curved portion in the vicinity of said pivotally mounted end of said clutch shoe,
said leaf spring engaging said restraining pin during rotation of said drive plate for resisting outward motion of said clutch shoe,
said leaf spring being collapsible into an S-shaped configuration by virtue of said preset curve and said restraining pin due to a centrifugal force associated with rotation of said clutch shoe at a preslected speed,
said S-shaped configuration being inwardly extending in the vicinity of said pivotally mounted end of said clutch shoe and being outwardly extending in the vicinity of the opposite end thereof,
said opposite ends of said leaf spring being freely rotatable within said notches upon deflection about said restraining pin.

11. A centrifugal clutch comprising:
an outer housing having a cylindrical flange,
a drive plate rotatably mounted within said housing axially of said cylindrical flange,
arcuately shaped clutch shoes pivotally mounted at one end thereof to said drive plate for being urged against said cylindrical flange during rotation of said drive plate,
a series of bores formed in the vicinity of each of said clutch shoes,
first and second slots disposed within each of said clutch shoes and an arc thereof separating said notches, a leaf spring having opposite ends slidably received within said first and second notches and spanning said arc thereby, a restraining pin cooperable with any one of said bores for changing the effect of the leaf spring and extending between said leaf spring and said associated clutch shoe, said leaf spring having a preset curved portion in the vicinity of said pivotally mounted end of said clutch shoe, said leaf spring engaging said restraining pin during rotation of said drive plate for resisting outward motion of said clutch shoe, said leaf spring being collapsible into an S-shaped configuration by virtue of said preset curve and said restraining pin due to a centrifugal force associated with rotation of said clutch shoe at a preselected speed, said S-shaped configuration being inwardly extending in the vicinity of said pivotally mounted end of said clutch shoe and being outwardly extending in the vicinity of the opposite end thereof, said opposite ends of said leaf spring being freely rotatable within said notches upon deflection about said restraining pin, said leaf spring exerting a force on said restraining pin during progressive outward movement of said clutch shoe which is increasing in magnitude for inward positions and decreasing in magnitude for outward positions, whereby centrifugal force moving said clutch shoe beyond an inward position will snap said shoe into full outward engagement with said cylindrical flange and whereby a reduction in centrifugal force sufficient to begin movement from full engagement with said cylindrical flange will snap said shoe into a full disengagement position.

12. A centrifugal clutch comprising:

an outer housing having a cylindrical flange, a drive plate rotatably mounted within said housing axially of said cylindrical flange, arcuately shaped clutch shoes mounted thereon for radial movement relative to said drive plate for being urged against said cylindrical flange during rotation of said drive plate, restraining means disposed in adjacency to each of said clutch shoes, a leaf spring secured to each of said clutch shoes and, means cooperable with each spring to secure ends of the spring against spreading during clutching operation, said leaf spring engaging said restraining means during rotation of said drive plate for resisting outward motion of said clutch shoe, said leaf spring being resiliently collapsible about said restraining means by a centrifugal force associated with rotation of said shoe, said leaf spring having a deflection characteristic with a decreasing force segment for progressive positions of said clutch shoe outward of a determinable point thereon, whereby said clutch shoe will remain in engagement with said cylindrical flange for speeds of said drive plate below the speed thereof required for initial engagement.

13. A centrifugal clutch comprising:

an outer housing having a cylindrical flange, a drive plate rotatably mounted within said housing axially of said cylindrical flange, arcuately shaped clutch shoes pivotally mounted for outward movement relative to said drive plate for being urged against said cylindrical flange during rotation of said drive plate, restraining means disposed in adjacency to each of said clutch shoes, a leaf spring secured to each of said clutch shoes and with opposite ends of each spring being disposed circumferentially on the same side of the shoe pivot, said leaf spring engaging said restraining means during rotation of said drive plate for resisting outward motion of said clutch shoe, said leaf spring being resiliently collapsible about said restraining means by a centrifugal force associated with rotation of said shoe at a preselected speed, said leaf spring exerting a force on said restraining means during progressive outward movement of said clutch shoe which is increasing in magnitude for inward positions and decreasing in magnitude for outward positions, whereby centrifugal force moving said clutch shoe beyond an inward position will snap said shoe into full outward engagement with said cylindrical flange and whereby a reduction in centrifugal force sufficient to begin movement from full engagement with said cylindrical flange will snap said shoe into a full disengagement position.

References Cited

UNITED STATES PATENTS

| | | | |
|---|---|---|---|
| 1,893,126 | 1/1933 | Bogopolsky | 188—184 |
| 2,005,250 | 6/1935 | Wemp | 192—89 |
| 2,406,543 | 8/1946 | Hunter | 192—89 |
| 2,626,034 | 1/1953 | Farwick | 192—89 |
| 3,283,867 | 11/1966 | Rice | 192—89 |

BENJAMIN W. WYCHE III, *Primary Examiner.*